United States Patent [19]
Lim

[11] Patent Number: 5,619,124
[45] Date of Patent: Apr. 8, 1997

[54] REFERENCE VOLTAGE GENERATOR IN A SEMICONDUCTOR INTEGRATED DEVICE

[75] Inventor: Young-Ho Lim, Suwon, Rep. of Korea

[73] Assignee: Samsung Electronics Co., Ltd., Suwon, Rep. of Korea

[21] Appl. No.: 348,183

[22] Filed: Nov. 28, 1994

[30] Foreign Application Priority Data

Nov. 26, 1993 [KR] Rep. of Korea .................. 25325/1993

[51] Int. Cl.$^6$ .................................................. H03F 3/45
[52] U.S. Cl. ................................ 323/313; 330/257
[58] Field of Search .................. 323/313–316; 327/538–542, 545; 330/257

[56] References Cited

U.S. PATENT DOCUMENTS 5,436,552  7/1995  Kajimoto .................. 323/313
5,497,119  3/1996  Tedrow .................. 327/540

*Primary Examiner*—Aditya Krishnan
*Attorney, Agent, or Firm*—Cushman Darby & Cushman, IP Group of Pillsbury Madison & Sutro LLP

[57] ABSTRACT

A reference voltage generator for generating a reference voltage having a constant voltage level. The reference voltage generator comprises a high voltage generating circuit for generating a boost voltage boosted over the power voltage level; a clamping circuit for clamping the boost voltage below a constant voltage; a ripple preventing circuit for preventing tipple of the boost voltage clamped through the clamping circuit; and a voltage dividing circuit for outputting a reference voltage which is below the power voltage by lowering the boost voltage outputted through the tipple preventing circuit.

18 Claims, 5 Drawing Sheets

REFERENCE VOLTAGE GENERATOR IN A SEMICONDUCTOR INTEGRATED DEVICE

BACKGROUND OF THE INVENTION

The present invention relates to a semiconductor integrated device, and more particularly to a reference voltage generator for generating a reference voltage having a constant voltage level.

In semiconductor integrated devices, it is very important to stably maintain an internal operational voltage so as to ensure operational stability and reliability of semiconductor integrated elements. Particularly, there should be a reference voltage generator for generating a reference voltage having a constant voltage level so that an interior of a chip is not influenced according to the variation of an external power voltage and so that the semiconductor integrated device is stably operated. Such a reference voltage generator is especially required in the semiconductor integrated devices which operate using a low power voltage. Obtaining a reference voltage from the reference voltage generator that does not have a very large deviation is difficult not only due to variation of the eternal power voltage, but also variation of temperature and manufacturing processes semiconductor integrated devices.

FIG. 1 is a view showing a reference voltage generator according to the conventional art. The reference voltage generator includes a resistance 5 formed between the power voltage VCC inputted from outside and a node N1 and an NMOS transistor 10 formed between the node N1 and a ground voltage VSS. In FIG. 1, a drain terminal and a gate terminal of the NMOS transistor 10 are connected to the node N I so as to be controlled by the reference voltage Vref.

With reference to FIGS. 1 and 2, the operation of the reference voltage generator according to the conventional art will be explained. Current I1 and I2 flowing into the resistance 5 and the NMOS transistor 10 are shown in FIG. 2 where the reference voltage Vref is generated as a voltage V1. When the power voltage VCC externally inputted is at the high level during operating the reference voltage generator of FIG. 1, the current I1 flowing into the resistance 5 is increased and a potential at the node N1 is raised. Since the node N1 is connected to the gate terminal of the NMOS transistor 10, the NMOS transistor 10 is turned on. Thereby, the current I2 flows into a channel of the transistor 10 to raise the potential of the reference voltage Vref.

On the other hand, when the power voltage VCC externally inputted is at the low level, the current I1 flowing into the resistance 5 is reduced and the potential at the node N 1 is dropped. However, since the node N1 is connected to the gate terminal of the NMOS transistor 10, the current I2 flows into the NMOS transistor 10 to relatively drop the potential of the reference voltage Vref. As mentioned above, in all the two cases that the power voltage VCC inputted is at the high level or low level, the reference Vref is raised or dropped according to the variation of the power voltage inputted.

Therefore, there arises a disadvantage that the reference voltage Vref with respect to the power voltage VCC is not stable. In the operation of the reference generator of FIG. 1, the current I1 is changed to I1', I1", I2 and I2" according to the characteristic of the resistance 5 or the transistor 10 due to the influence on the manufacturing process of the semiconductor integrated device. At a result, the reference voltage Vref is also changed to V1' and V2". Further, it is difficult to maintain the reference voltage Vref at a constant level, since the resistance 5 or the transistor 10 forming the reference voltage generator shown in FIG. 1 sensitively operate in accordance with variation of the temperature.

FIG. 3 is a view showing another reference voltage generator according to the conventional art. The reference voltage generator shown in FIG. 3 includes an N-channel depletion transistor 15 formed between the power voltage VCC inputted from outside and a node N2 and an N-channel depletion transistor 20 formed between the node N2 and the ground voltage VSS. The gate terminals of the N-channel depletion transistors 15 and 20 are connected to the ground voltage VSS, respectively.

The reference voltage generator of FIG. 3 will be explained in detail with reference to FIG. 4, which shows the relationship between voltage and current. In the reference voltage generator of FIG. 3, the current flowing into the N-channel transistors 15 and 20 is represented as I3 and I4. In such case, the reference voltage Vref is designated as a voltage V2. However, the current flowing into the N-channel depletion transistors 15 and 20 is changed to I3', I3", I4' and I4" according to the variation of temperature and the manufacturing process of the semiconductor integrated device. Thus, it is difficult to maintain the reference voltage Vref at constant level.

FIG. 5 is a view showing another reference generator according to the conventional art. FIG. 6 is a view showing the relationship between the reference voltage and the power voltage of FIG. 5. The reference voltage generator shown in FIG. 5 is comprised of a resistance 25 formed between the power voltage VCC and a node N3; a resistance 30 formed between the node N3 and a node N4; and NMOS transistors 35 and 40 connected between the node N4 and the ground voltage VSS. A gate terminal of a PMOS transistor 45 is connected to the node N4, a source terminal thereof to the reference Vref, and a drain terminal thereof to a source terminal of the NMOS transistor 40. Further, the gate terminal of the NMOS transistor 40 is coupled to the power voltage VCC.

The operation of FIG. 5 will be explained in detail with reference to FIG. 6, which shows the relationship between the reference voltage and the power voltage. If the reference voltage VCC having the constant voltage level is inputted to the reference voltage generator, the reference voltage Vref is clamped. In a case that the power voltage VCC is at the high level during the operation of the reference voltage generator shown in FIG. 5, the potential at the node N3 is raised, and the NMOS transistor 35 is then turned on. Thereby, the potential at the node N4 is dropped, and the PMOS transistor 45 is then turned on. Accordingly, the potential of the reference voltage Vref is dropped to be maintained at constant level because the potential at the node 3 is relatively dropped.

Meanwhile, in the other case that the power voltage VCC is at the low level, the potential at the node N3 is dropped, and the current flowing into the ground voltage from the NMOS transistors 35 and 45 is then reduced. Hence, the potential of the reference voltage Vref is kept at the constant level.

As shown in FIG. 6, when the power voltage VCC is linearly raised, the reference Vref must be kept at the constant value. However, the reference voltage Vref is changed to Vref' and Vref" due to a problem according to temperature and the manufacturing process of the semiconductor integrated device. Such deviation results from the variations of threshold voltages and resistance elements for each of the transistors.

Therefore, the reference voltage generator according to the conventional art can not generate the reference voltage having the constant voltage level owing to the variations of the power voltage externally inputted and the reference voltage in accordance with the manufacturing process of the semiconductor integrated device and temperature deviation. Thereby, there is much influence on the operational stability and reliability in the semiconductor integrated device.

SUMMARY OF THE INVENTION

It is therefore object of the present invention to provide a semiconductor integrated circuit capable of supplying a reference voltage having a constant voltage level by minimizing the variations of a power voltage externally inputted and a reference voltage in accordance with a manufacturing process of the semiconductor integrated device and temperature deviation.

The reference voltage generator according to an aspect of the object of the present invention comprises a high voltage generating circuit for generating boost voltage boosted over the level of the power voltage, a damping circuit for clamping the boost voltage below a constant voltage, a ripple preventing circuit for preventing ripple of the boost voltage clamped through the clamping circuit, a voltage dividing circuit for outputting the reference voltage being below the level of the power voltage by lowering the boost voltage outputted through the ripple preventing circuit.

BRIEF DESCRIPTION OF THE DRAWINGS

The above and other objects, advantages and features of the present invention will be more apparent from the following detailed description taken with the attached drawings in which.

DETAILED DESCRIPTION OF THE PREFERRED EMBODIMENT

Figure 1:
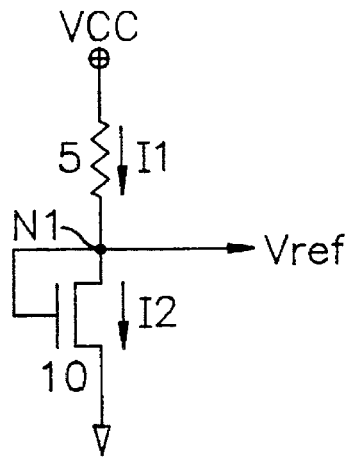
FIG. 1 is a view showing a reference voltage generator according to the conventional art.
Figure 2:
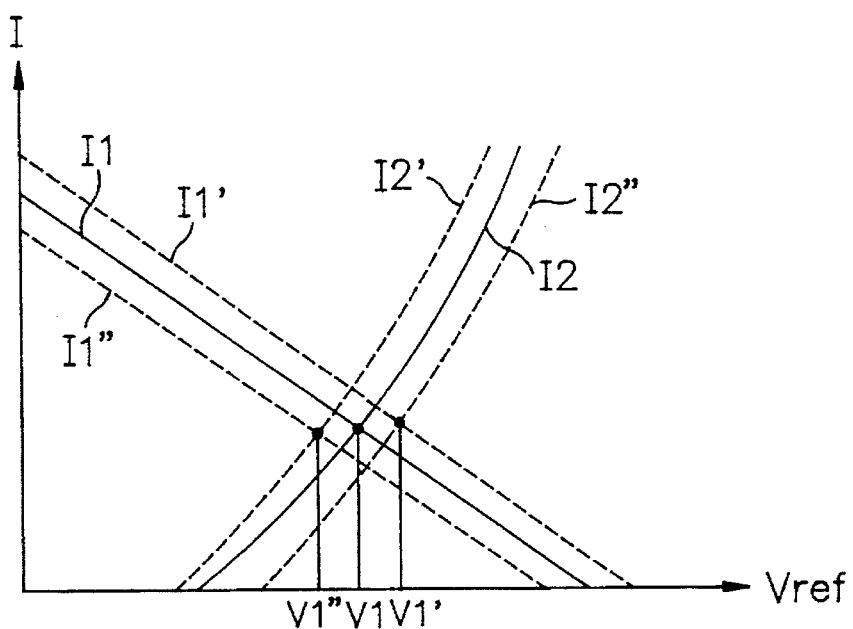
FIG. 2 is a view showing relationship between voltage and current according to FIG. 1.
Figure 3:
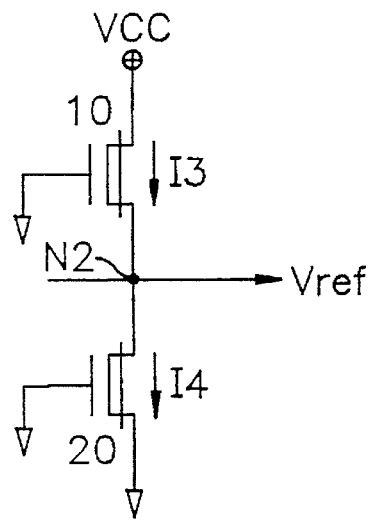
FIG. 3 is a view showing the other reference voltage generator according to the conventional art.
Figure 4:
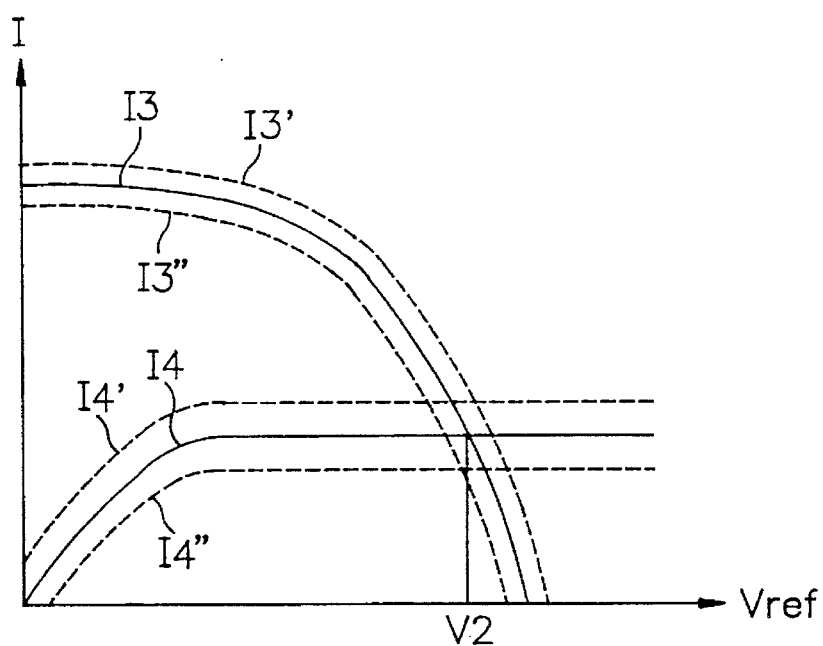
FIG. 4 is a view showing relationship between voltage and current according to the conventional art.
Figure 5:
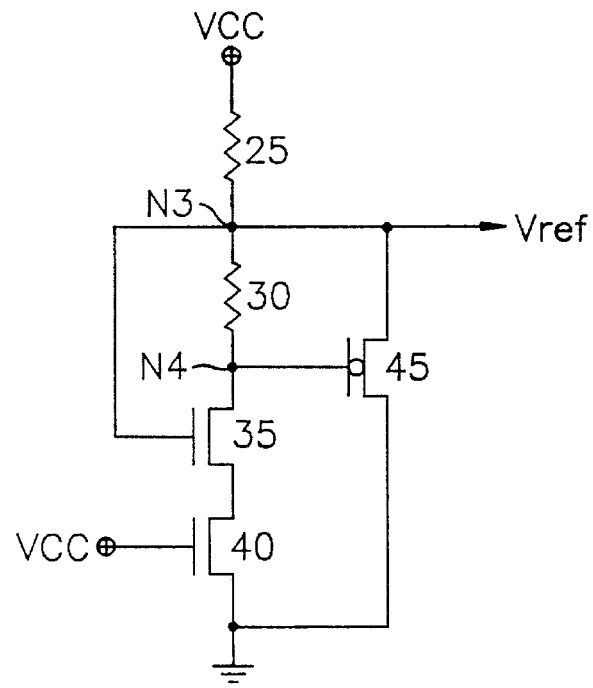
FIG. 5 is a view showing another reference voltage generator according to the conventional art.
Figure 6:
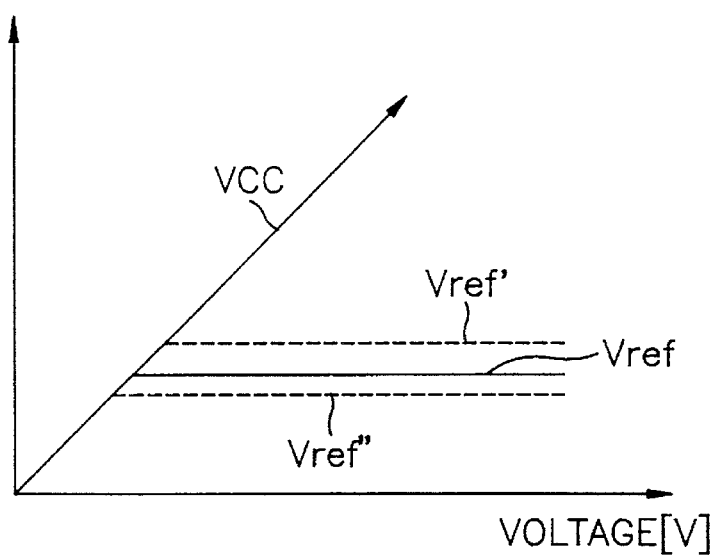
FIG. 6 is a view showing relationship between a reference voltage and a power voltage of FIG. 5.
Figure 7:
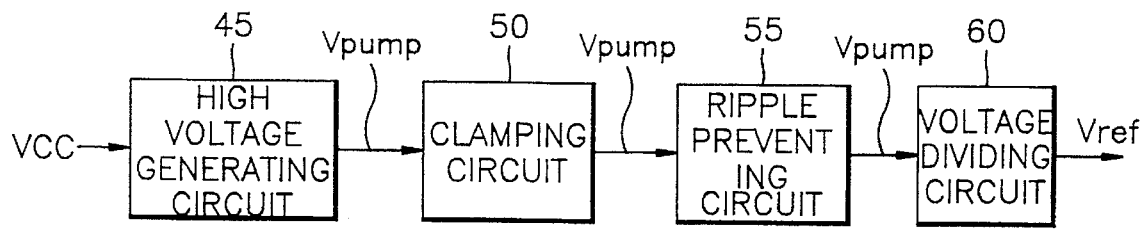
FIG. 7 is a block diagram of a reference voltage generator according to the present invention.

FIG. 7 is a block diagram of a reference voltage generator according to the present invention. The reference voltage generator shown in FIG. 7 includes a high voltage generating circuit 45 for generating a boost voltage Vpump which is boosted to a level greater than a power voltage VCC externally inputted the outside; a clamping circuit 50 for clamping the boost voltage Vpump below a predetermined voltage; a ripple preventing circuit 55 for preventing ripple of the boost voltage Vpump clamped through the clamping circuit 50; and a voltage dividing circuit 60 for lowering the boost voltage Vpump outputted through the ripple preventing circuit 55 below the power voltage VCC.

As a circuit for boosting the power voltage VCC externally inputted, the high voltage generating circuit 45 is composed of a series of charge pumping circuits so as to boost the voltage level, in response to a predetermined pumping clock generated from an oscillator. Such charge pumping circuits are comprised by pumping capacitors.

As a circuit for clamping the boost voltage Vpump outputted from the high voltage generating circuit 45, the clamping circuit 50 is constructed to clamp the boost voltage Vpump by a reverse break down voltage of diode.

The ripple preventing circuit 55 is composed of a capacitor having a predetermined capacitance for preventing ripple of the clamped boost voltage Vpump.

Further, the voltage dividing circuit 60 generates the reference voltage Vref of approximately 1 to 3 volts and is constructed to connect in serial a resistance made of a polysilicon layer or a resistance having a layer where impurity is diffused.

Figure 8:
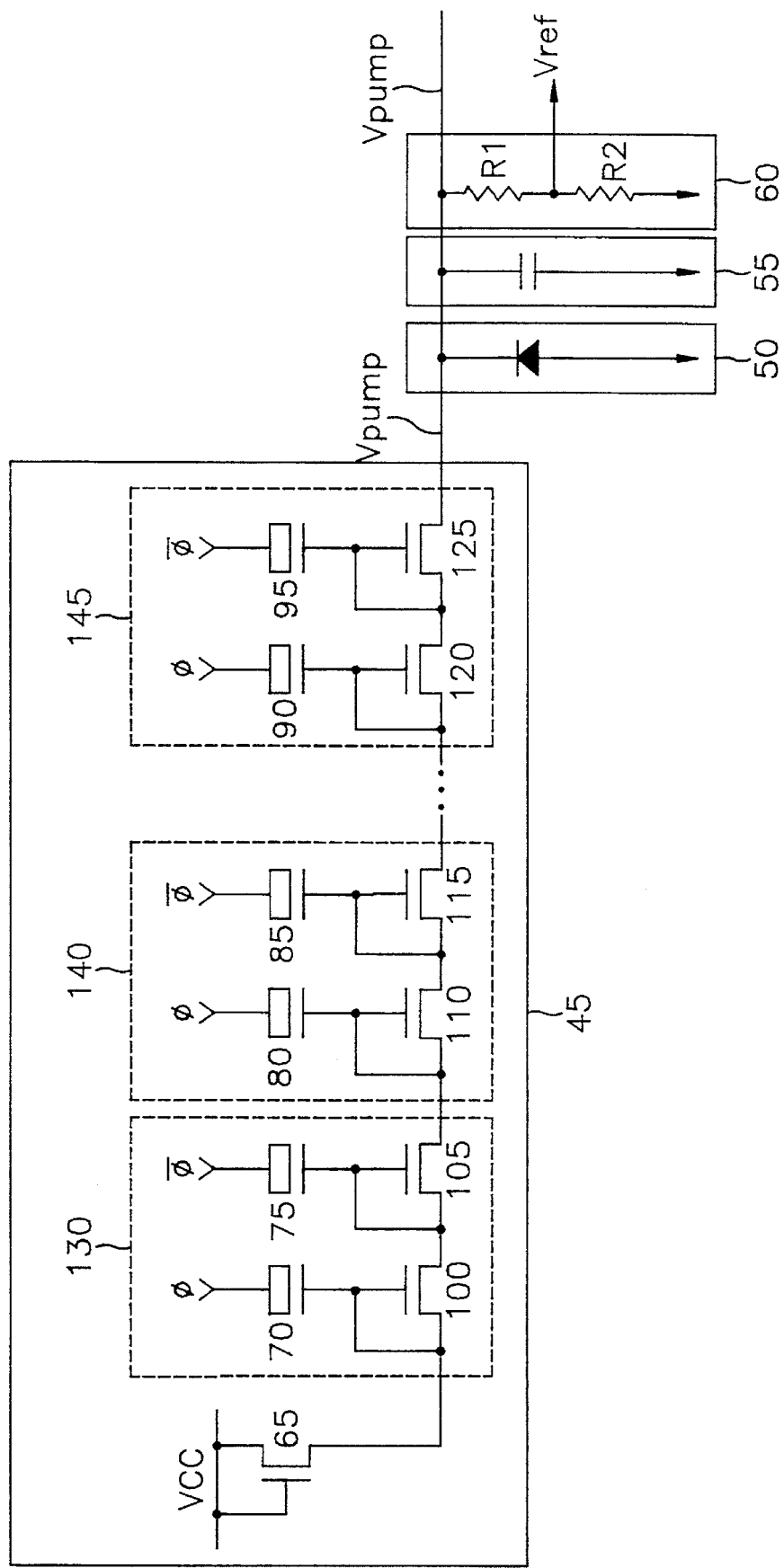
FIG. 8 is a detailed circuit view of a reference voltage generator of FIG. 7.

FIG. 8 is the detailed view of the reference voltage generator according to FIG. 7. The high voltage generating circuit 45 includes an NMOS transistor 65 connecting the power voltage VCC to a gate terminal and a drain terminal thereof in common. A first charge pumping circuit 130 of the high voltage generating circuit 45 is connected to a source terminal of the NMOS transistor 65 at a channel thereof, which is composed of an NMOS transistor 100 whose gate terminal is connected to a pumping capacitor 70; and an NMOS transistor 105 whose channel is connected to a channel of the NMOS transistor 100, and whose gate is connected to the pumping capacitor 75. A second charge pumping circuit 140 is connected to a channel of the NMOS transistor 105 of the first charge pumping circuit, which is composed of an NMOS transistor 110 whose gate terminal is connected to a pumping capacitor 80; and an NMOS transistor 115 whose channel is connected to the channel of the NMOS transistor 110, and whose gate is connected to the pumping capacitor 75. Further, an N charge pumping circuit 145 is connected to one of channels of N-1 charge pumping circuits which are not shown, which is composed of an NMOS transistor 120 whose gate terminal is connected to a pumping circuit 90; and an NMOS transistor 125 whose channel is connected to a channel of the NMOS transistor 120, and whose gate terminal is connected to a pumping capacitor 95. The gates of the NMOS transistors 100, 105, 110, 120, and 125 are connected to one of the channels in common. Predetermined pumping clocks $\phi$ and $\bar{\phi}$ generated from the oscillator are applied to the pumping capacitors 70, 75, 80, 85, . . . , 90 and 95. The pumping clocks $\phi$ and $\bar{\phi}$ have an opposite phase and are generated continuously, having a constant period.

In the construction of the high voltage generating circuit 45, if the power voltage VCC is externally inputted to the NMOS transistor 65, the NMOS transistor 65 is turned on. Thereby, the input signal of the power VCC is inputted to a first charge pumping circuit. Then, the pumping capacitor 70 charge-pumps the power voltage VCC in response to the pumping clock $\phi$. The NMOS transistor 100 is turned on, and the boost signal having the voltage which is more boosted than the power voltage VCC is, then, generated in the channel of the NMOS transistor 100. Thereby, the pumping capacitor 75 charge-pumps the boost signal boosted by the pumping capacitor 70 in response to the pumping clock $\bar{\phi}$. In addition, the NMOS transistor 105 is turned on, and the boost signal which has the higher potential than the signal boosted by the pumping capacitor 70 is, then, generated in the channel of the NMOS transistor 105.

As shown in FIG. 8, the power voltage VCC outputs the boost signal Vpump corresponding to the last output signal by the charge pumping circuits 130, 140, and 145 of the high voltage generating circuit 45. The voltage level of the boost voltage Vpump depends on the pumping clocks φ and φ̄ and capacitances of the capacitors 70, 75, 80, 85, . . . , 90 and 95.

Figure 9:
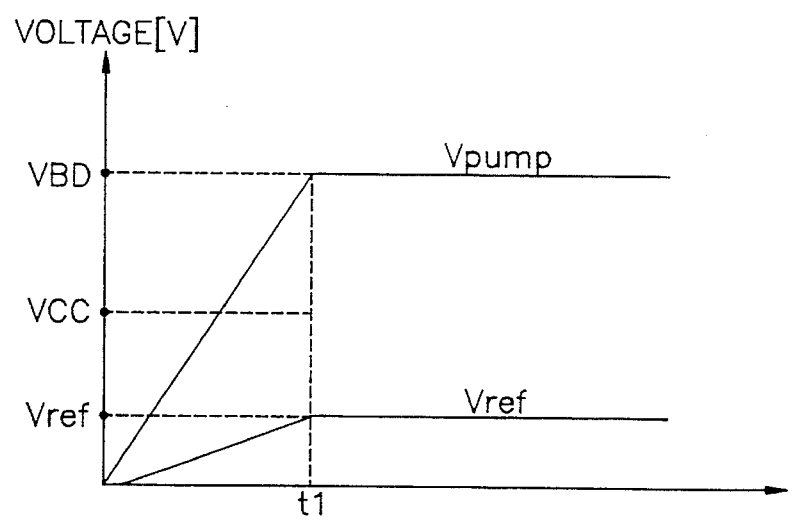
FIG. 9 is an operational timing diagram of a reference voltage generator of FIG. 8.

The boost voltage Vpump outputted from the high voltage generating circuit 45 is inputted to the clamping circuit 50 shown in FIG. 7. The clamping circuit 50 uses a junction diode in order to clamp the boost voltage Vpump outputted from the high voltage generating means 45. According to this construction, the boost voltage Vpump is clamped by the reverse break down voltage of the diode. That is, as shown in FIG. 9, the boost voltage Vpump is damped by the reverse break down voltage of the diode after time t1, which is maintained at the constant level, even if time has passed.

The ripple preventing circuit 55 is composed of a capacitor having a predetermined capacitance to avoid ripple in the clamped boost voltage from the pumping clocks φand φ̄. Thereby, the boost voltage Vpump clamped by the clamping circuit 50 is constantly maintained at higher level than the power voltage VCC without having tipple. The boost voltage Vpump has voltage level of approximately 10 to 18 volts.

Moreover, the voltage dividing circuit 60 connects serially the resistance R1 made of the polysilicon layer or the resistance R2 having the diffusion layer where impurity is diffused, and then generates the reference voltage Vref having the potential which is lower than the power voltage VCC externally inputted according to the ratio of the resistances R1 and R2. Such the reference voltage Vref has value of approximately 1 to 3 volts. The resistances R1 and R2 forming the voltage dividing circuit 60 not only can be formed as the polysilicon layer, or the diffusion layer but also can be implemented as a transistor having a predetermined threshold voltage.

In the reference voltage generator according to the present invention, the reverse break down voltage of the junction diode forming the clamping circuit 50 functions as a main fact changing the reference voltage Vref in the process of manufacturing the semiconductor. However, the reverse break down voltage of the junction diode is low in deviation of the manufacturing process. Further, there is scarcely variation when temperature changes. If, the break down voltage is changed by 1 volt due to problems occurred during the manufacturing process and the ratio of the resistances R1 and R2 is 9 to 1, the reference voltage Vref is changed by 0.1 volt. Considering the deviation of the substantial break down voltage, it is possible to have stable voltage level, unlike the conventional reference voltage generator.

Therefore, according to the present invention, there is an advantage capable of improving the stability and reliability in the operation of the semiconductor integrated circuit by providing the reference voltage having a constant voltage externally level regardless of the variations of the power voltage inputted by the reference voltage generator and the reference voltage in accordance with the temperature deviation and the manufacturing process of the semiconductor integrated device.

What is claimed is:

1. An integrated circuit reference voltage generator for generating a reference voltage having a constant voltage level in response to input of a power voltage having a power voltage level that is externally inputted, comprising:

high voltage generating means for generating a boost voltage boosted over said power voltage level;

clamping means for clamping said boost voltage to a constant voltage;

ripple preventing means for preventing ripple of said boost voltage clamped to said constant voltage by said clamping means; and voltage dividing means for outputting a reference voltage having said constant voltage level which is below said power voltage level by lowering said boost voltage outputted through said ripple preventing means.

2. An integrated circuit reference voltage generator as claimed in claim 1, wherein said high voltage generating means is composed of a charge pumping capacitor for boosting said power voltage in response to a predetermined pumping clock.

3. An integrated circuit reference voltage generator as claimed in claim 1, wherein said clamping means is composed of a diode so that said boost voltage is clamped by a predetermined reverse break down voltage.

4. An integrated circuit reference voltage generator as claimed in claim 1, wherein said ripple preventing means is composed of a capacitor having a predetermined capacitance.

5. An integrated circuit reference voltage generator as claimed in claim 1, wherein said boost voltage clamped by said clamping means has a clamped level of 10 to 18 volts.

6. An integrated circuit reference voltage generator as claimed in claim 1, wherein said constant voltage level of said reference voltage is 1 to 3 volts.

7. An integrated circuit reference voltage generator as claimed in claim 1, wherein said voltage dividing means is composed of two serially connected resistive elements.

8. An integrated circuit reference voltage generator as claimed in claim 7, wherein said resistive elements are composed of one of a polysilicon resistance layer and an impurity diffusion resistance layer.

9. A semiconductor integrated circuit for generating a reference voltage having a constant voltage level in response to input of a power voltage having a power voltage level that is externally inputted, comprising:

high voltage generating means for generating a boost voltage boosted over said power voltage level;

clamping means for clamping said boost voltage to a constant voltage; and voltage dividing means for lowering said boost voltage clamped by said clamping means so that a reference voltage having a reference voltage level which is below said power voltage level is outputted in response to the input of said boost voltage.

10. A semiconductor integrated circuit as claimed in claim 9, wherein said high voltage generating means is composed of a charge pumping capacitor to boost said power voltage in response to a predetermined pumping clock.

11. A semiconductor integrated circuit as claimed in claim 9, wherein said voltage dividing means is composed of a resistive elements connected in serial.

12. A semiconductor integrated circuit as claimed in claim 9, wherein said boost voltage is 10 to 18 volts.

13. A semiconductor integrated circuit as claimed in claim 9, wherein said constant voltage level of said reference voltage is 1 to 3 volts.

14. A semiconductor integrated circuit for generating a reference voltage having a constant voltage level in response to input of a power voltage having a power voltage level that is externally inputted, comprising:

a voltage generator that generates a boost voltage boosted over said power voltage level;

a clamp that clamps said boost voltage to a constant voltage; and a voltage divider that lowers said boost voltage clamped by said clamp so that a reference voltage having a reference voltage level which is below said power voltage level is outputted in response to the input of said boost voltage.

15. A semiconductor integrated circuit, as claimed in claim 14, wherein said voltage generator is composed of a charge pumping capacitor to boost said power voltage in response to a predetermined pumping clock.

16. A semiconductor integrated circuit as claimed in claim 14, wherein said voltage divider is composed of a resistive elements connected in serial.

17. A semiconductor integrated circuit as claimed in claim 14, wherein said boost voltage is 10 to 18 volts.

18. A semiconductor integrated circuit as claimed in claim 14, wherein said constant voltage level of said reference voltage is 1 to 3 volts.

* * * * *